(12) United States Patent
Aposhian et al.

(10) Patent No.: US 11,350,578 B1
(45) Date of Patent: Jun. 7, 2022

(54) DYNAMICALLY CALCULATING A STACKING HEAD'S PATH DURING A STACKING OPERATION

(71) Applicant: FireFly Automatix, Inc., Salt Lake City, UT (US)

(72) Inventors: Steven R. Aposhian, Farmington, UT (US); Eric E. Aston, Farmington, UT (US); William M. Decker, Salt Lake City, UT (US); Daniel A. Aposhian, West Valley City, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 0 days.

(21) Appl. No.: 17/177,643

(22) Filed: Feb. 17, 2021

(51) Int. Cl.
*A01G 20/15* (2018.01)
*B65G 57/03* (2006.01)
*B65G 61/00* (2006.01)

(52) U.S. Cl.
CPC ............ *A01G 20/15* (2018.02); *B65G 57/03* (2013.01); *B65G 61/00* (2013.01)

(58) Field of Classification Search
CPC ......... B25J 9/1666; G05B 2219/40442; G05B 2219/39082; G05B 2219/40121; G05B 2219/40317; G05B 2219/40476; A01G 20/15; B65G 57/03; B65G 61/00
See application file for complete search history.

(56) References Cited

U.S. PATENT DOCUMENTS

| | | | |
|---|---|---|---|
| 10,155,632 B2* | 12/2018 | Aposhian | B65B 57/14 |
| 2004/0249508 A1* | 12/2004 | Suita | B25J 9/1666 700/245 |
| 2010/0292843 A1* | 11/2010 | Kariyazaki | B25J 9/1676 700/264 |
| 2011/0196533 A1* | 8/2011 | Scheurer | B25J 9/1666 700/255 |
| 2012/0158178 A1* | 6/2012 | Hyung | B25J 9/1666 700/255 |
| 2017/0348856 A1* | 12/2017 | Nakaya | B25J 9/1664 |
| 2019/0039242 A1* | 2/2019 | Fujii | G05B 19/19 |

* cited by examiner

*Primary Examiner* — Gregory W Adams
(74) *Attorney, Agent, or Firm* — Kirton McConkie; Brian Tucker

(57) ABSTRACT

A stacking head's path can be dynamically calculated during a stacking operation. A control system of a sod harvester can include a dynamic path calculator for performing these dynamic calculations to prevent the stacking head from colliding with the sod harvester's frame or to cause the stacking head to traverse the most efficient path between the pickup position and the stacking position. These dynamic calculations could be performed in scenarios where the pickup position may be dynamically adjusted for a particular stacking operation.

16 Claims, 17 Drawing Sheets

US 11,350,578 B1

DYNAMICALLY CALCULATING A STACKING HEAD'S PATH DURING A STACKING OPERATION

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1 and sod harvester 200 shown in FIG. 2. Sod harvesters 100 and 200 are both in the form of a tractor and include a cutting head 101, 201 that cuts slabs of sod from the ground, inclined conveyor(s) 102, 202 that elevate the slabs from the ground towards a stacking conveyor 103, 203, a stacking head 105, 205 that is mounted to a support mechanism 104, 204, and a pallet dispenser 106, 206 that is positioned adjacent a pallet support (not visible) on which stacking head 105, 205 stacks slabs that it has removed from stacking conveyor 103, 203.

Two general types of harvesters exist: slab harvesters such as sod harvester 100; and roll harvesters such as sod harvester 200. A roll harvester forms the slabs of sod into rolls (e.g., utilizing a roll forming mechanism 207) which are then accumulated on the stacking conveyor for pick up. A slab harvester, on the other hand, directly stacks the slabs in their flat form.

BRIEF SUMMARY

The present invention extends to techniques for dynamically calculating a stacking head's path during a stacking operation. A control system of a sod harvester can include a dynamic path calculator for performing these dynamic calculations to prevent the stacking head from colliding with the sod harvester's frame or to cause the stacking head to traverse the most efficient path between the pickup position and the stacking position. These dynamic calculations could be performed in scenarios where the pickup position may be dynamically adjusted for a particular stacking operation.

In some embodiments, the present invention may be implemented by a control system of a sod harvester as a method for dynamically predicting a collision between the sod harvester's stacking head and frame. During a stacking operation, the control system can detect that the stacking head is to be moved from a first position to a second position along a path. The control system can calculate a virtual fence for the stacking head along the path and compare the virtual fence to a frame envelope representing boundaries of the frame of the sod harvester to thereby determine that the virtual fence will intersect with the frame envelope as the stacking head moves from the first position to the second position along the path. In response to determining that the virtual fence will intersect with the frame envelope, preventing the stacking head from moving from the first position to the second position along the path.

In some embodiments, the present invention may be implemented as a sod harvester that includes: a stacking conveyor positioned alongside a frame; a pallet support positioned within the frame; a stacking head that is configured to remove sod from the stacking conveyor and stack the sod on a pallet positioned on the pallet support; and a control system for causing the stacking head to be moved between one or more pickup positions overtop the stacking conveyor and one or more stacking positions overtop the pallet. The control system can include a dynamic path calculator that is configured to detect and prevent collisions between the stacking head and the frame.

In some embodiments, the present invention may be implemented by a control system of a sod harvester as a method for dynamically calculating a stacking head's path during a stacking operation. The control system can detect a first position and determine a second position. The control system can then calculate a virtual fence for the stacking head along a first path between the first position and the second position. The control system can compare the virtual fence along the first path to a frame envelope. In response to determining that the virtual fence along the first path intersects with the frame envelope, the control system can calculate a second path from the first position to the second position.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle. The term "control system" should encompass any combination of hardware and/or software. For example, a control system may include hardware- and/or software-based circuitry such as, but not limited to, a central processing unit, a microprocessor, a microcontroller, a field programming gate array, an application-specific integrated circuit, a system on a chip, etc.

Figure 1:
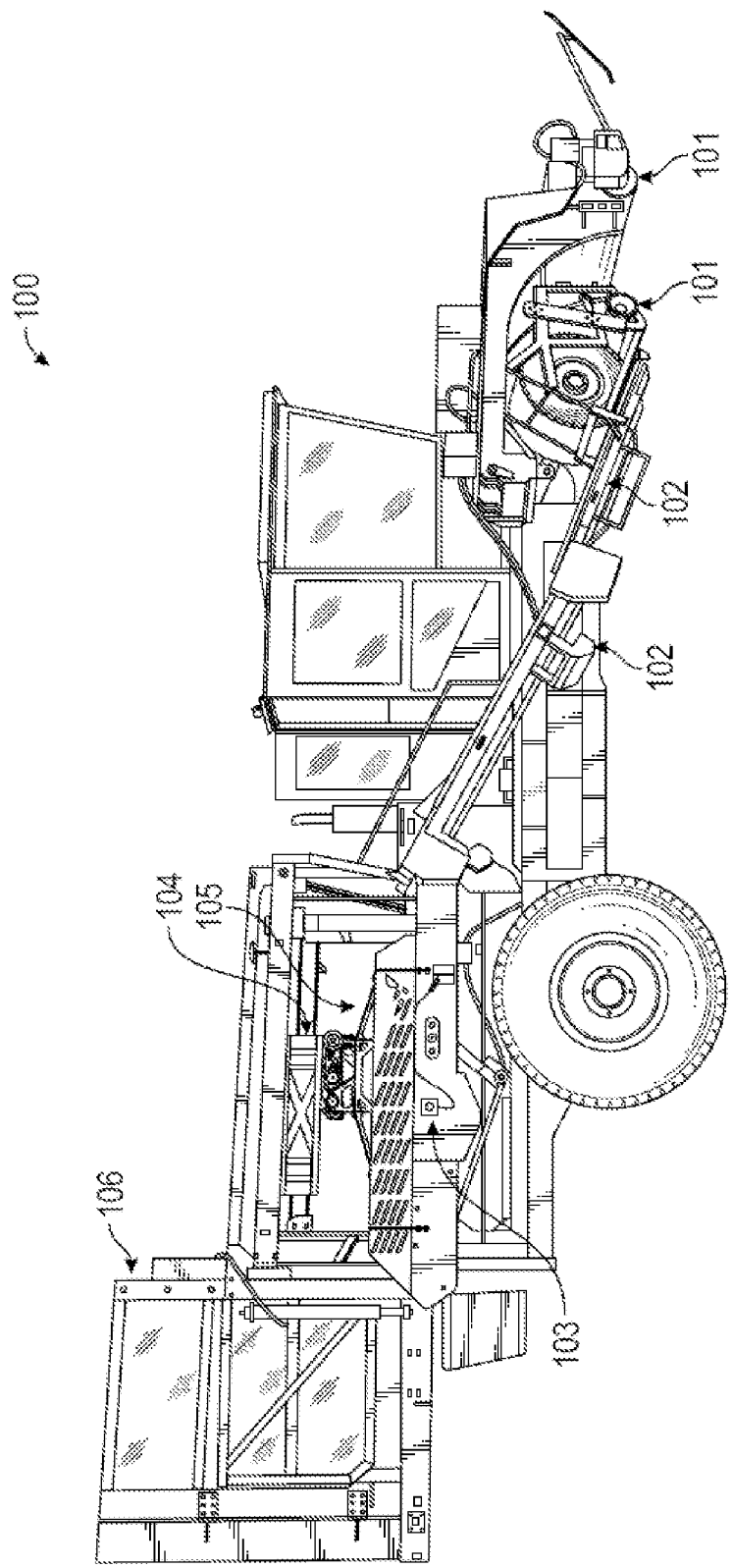
FIG. 1 illustrates a prior art sod harvester that harvests sod in slabs.
Figure 2:
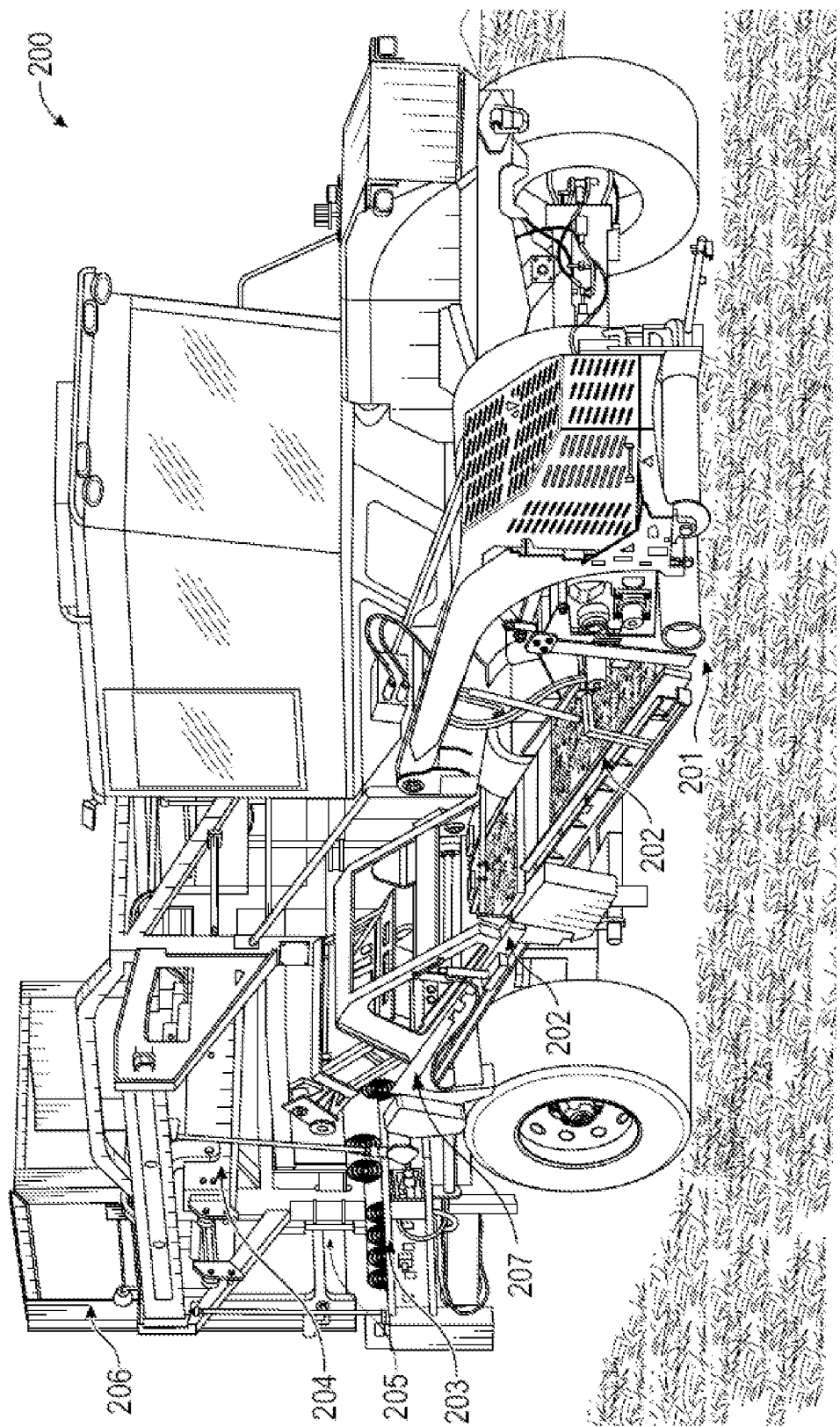
FIG. 2 illustrates a prior art sod harvester that harvest sod in rolls.
Figure 3A:
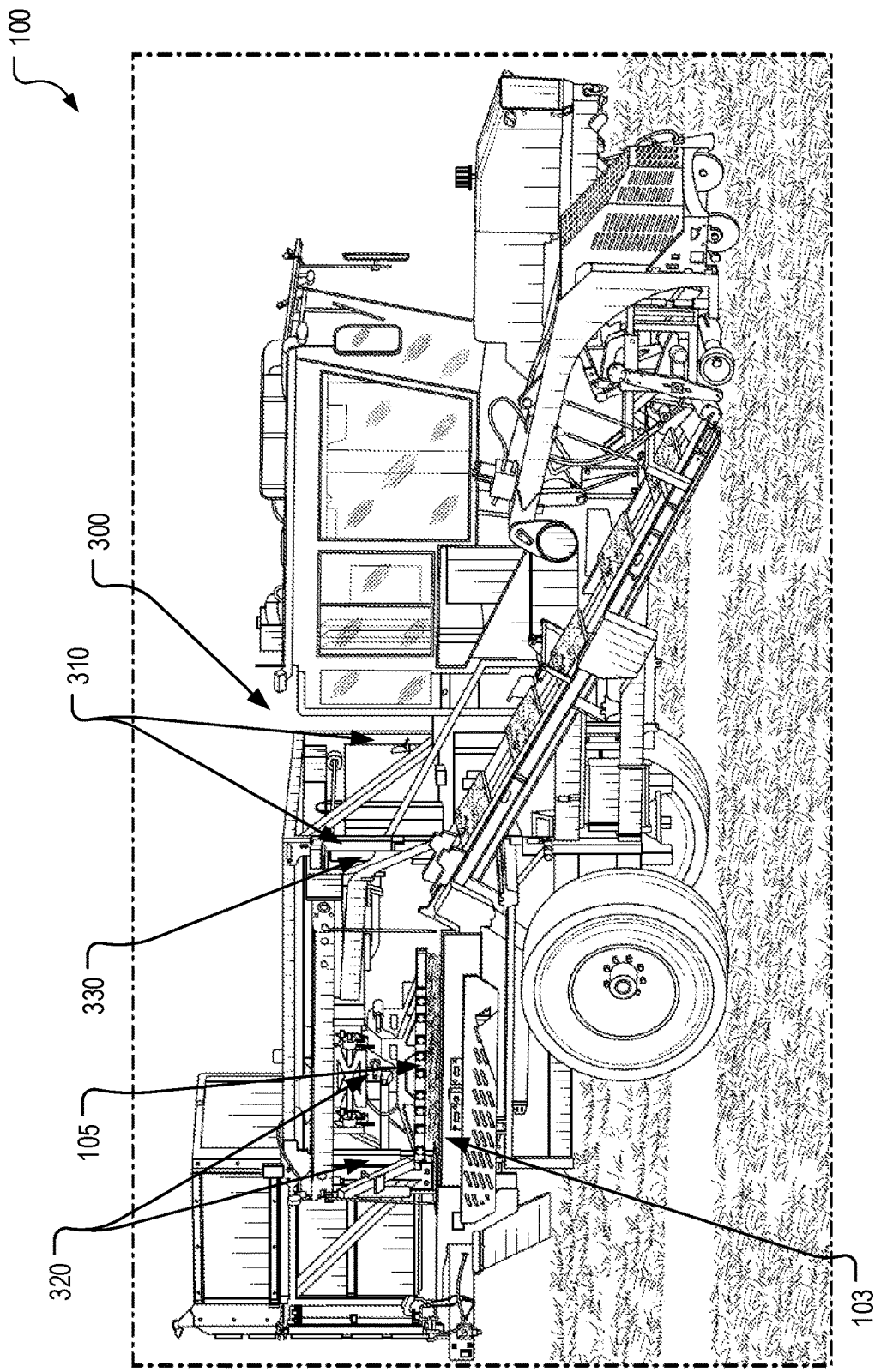
FIGS. 3A and 3B illustrate an example of various components of a sod harvester's frame that may form an envelope around the stacking area.
Figure 3B:
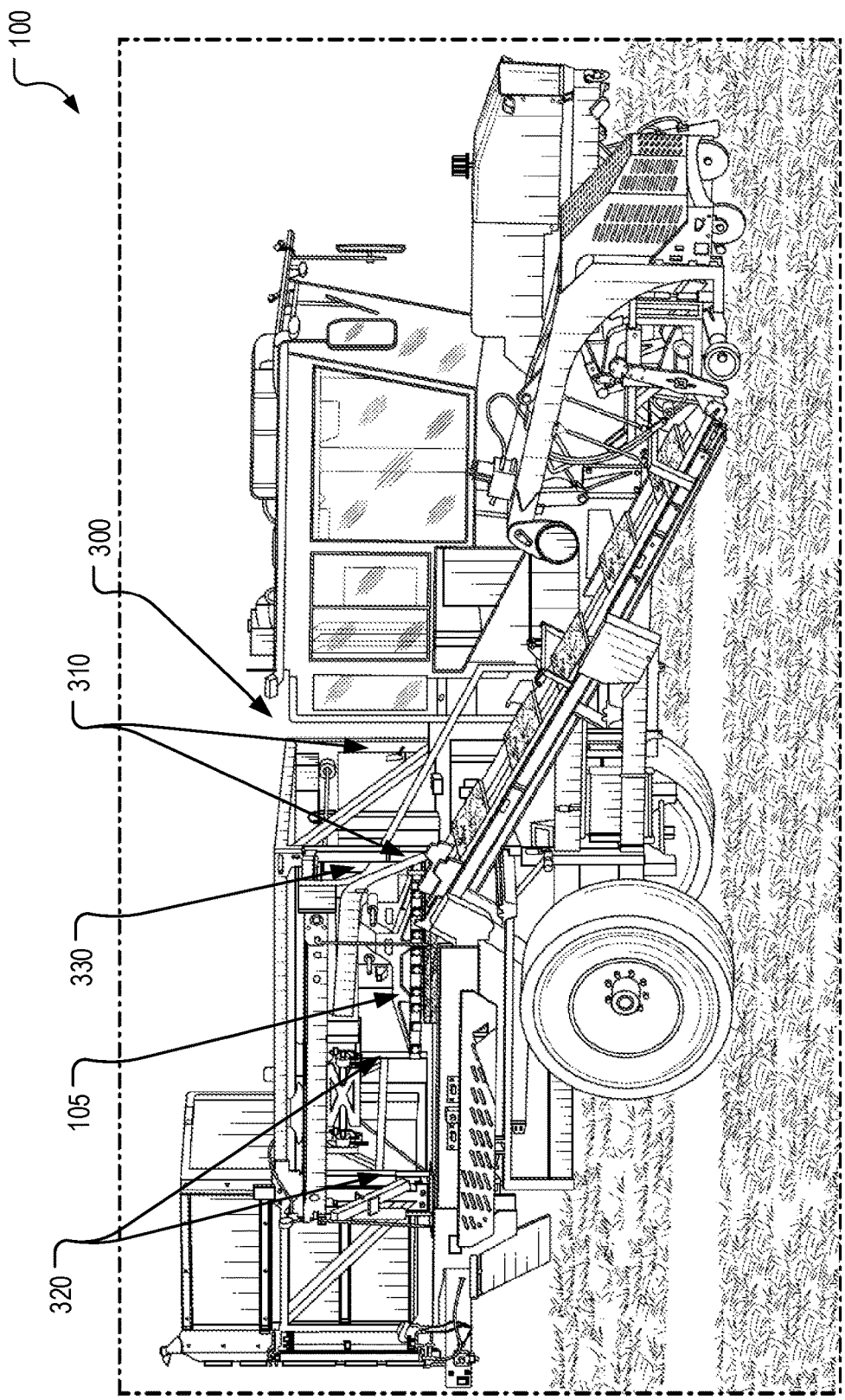

FIGS. 3A and 3B provide side views of sod harvester 100 during a stacking operation. In FIG. 3A, stacking head 105 is shown in a pickup position overtop stacking conveyor 103. The term "pickup position" will be used to represent the position that the stacking head is in when it removes sod from the stacking conveyor for the purpose of stacking the sod. In FIG. 3B, stacking head 105 is shown in a stacking position overtop a pallet. The term "stacking position" will be used to represent the position that the stacking head is in when it releases sod for the purpose of stacking the sod. As described in detail below, there may be multiple pickup positions and stacking positions. Also, the pickup positions could be dynamically determined or could be dependent on a variety of changing factors or circumstances.

Both FIGS. 3A and 3B identify portions of a frame 300 of sod harvester 100 that define an envelope around the stacking area. The term "stacking area" will be used to represent the area above the pallet that encompasses the various stacking positions. The identified portions of frame 300 include front vertical supports 310 and rear vertical supports 320 which form the corners of the rectangular structure that supports the stacking head assembly. The identified portions of frame 300 also include a vertical support 330 of a pallet support assembly.

Figure 4A:
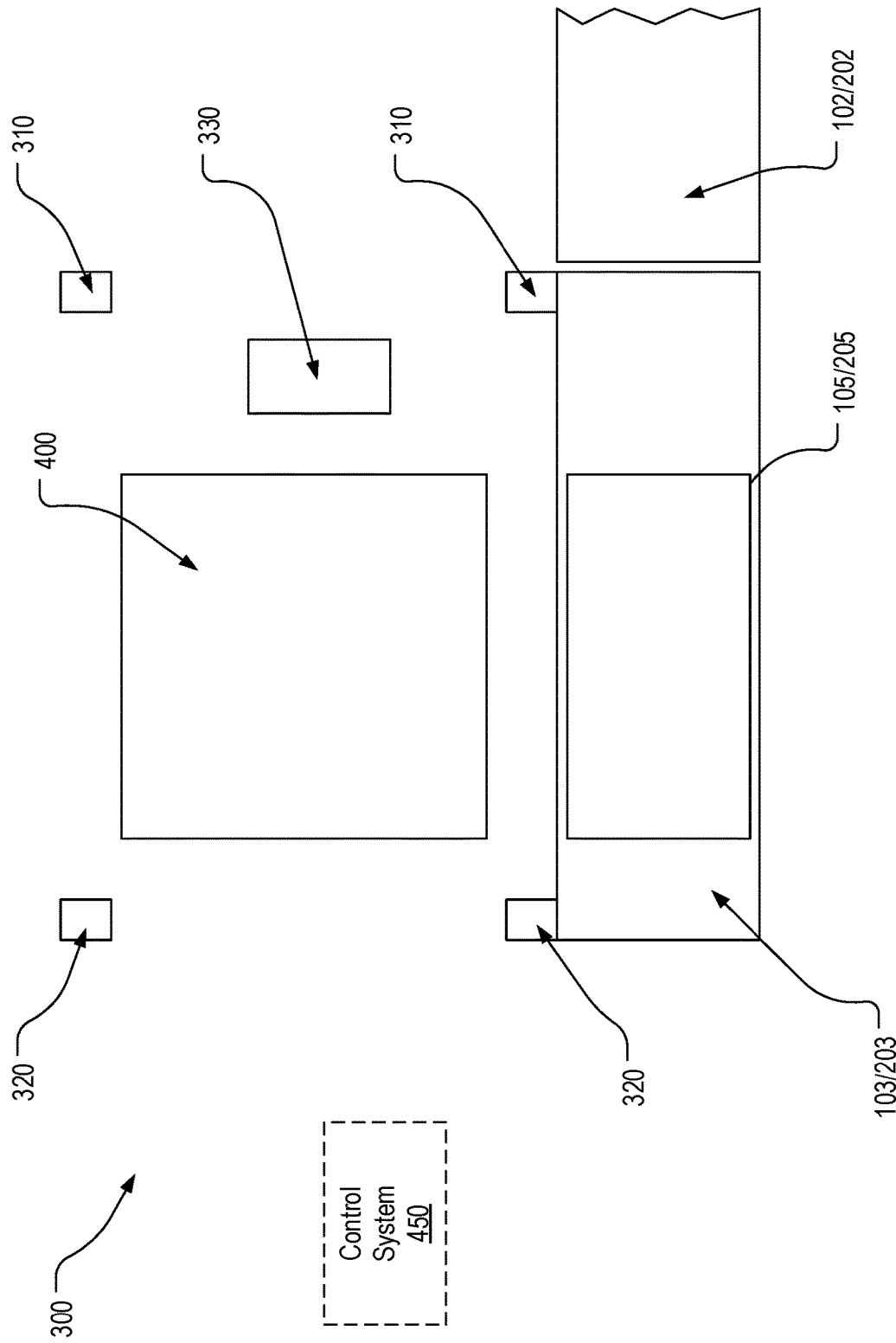
FIGS. 4A and 4B also illustrate an example of various components of a sod harvester's frame that form an envelope around the stacking area.

FIG. 4A represents a simplified top view of the stacking area of either sod harvester 100 or sod harvester 200. In FIG. 4A, some of frame 300 and the stacking head assembly are not shown to simplify the illustration. Front vertical supports 310 and rear vertical supports 320 define a rectangular area around pallet 400. Vertical support 330 of the pallet support assembly is positioned within this rectangular area. Although not shown, the pallet support assembly includes forks that extend under pallet 400. These forks move vertically along vertical support 330 to lower pallet 400 as sod is stacked on it and to place pallet 400 on the ground. Stacking conveyor 103/203 is positioned alongside this rectangular area. Stacking head 105/205 is shown in one possible pickup position. A control system 450 can detect sod that is advanced up inclined conveyor 102/202 and onto stacking conveyor 103/203 and can position stacking head 105/205 in an appropriate pickup position from which stacking head 105/205 can secure the sod, travel to the appropriate stacking position and then release it onto pallet 400. It is important that stacking head 105/205 does not contact any part of frame 300 as it travels from the pickup position to the stacking position or as it travels from the stacking position to the next pickup position since such a collision could cause serious damage to the sod harvester.

Figure 4B:
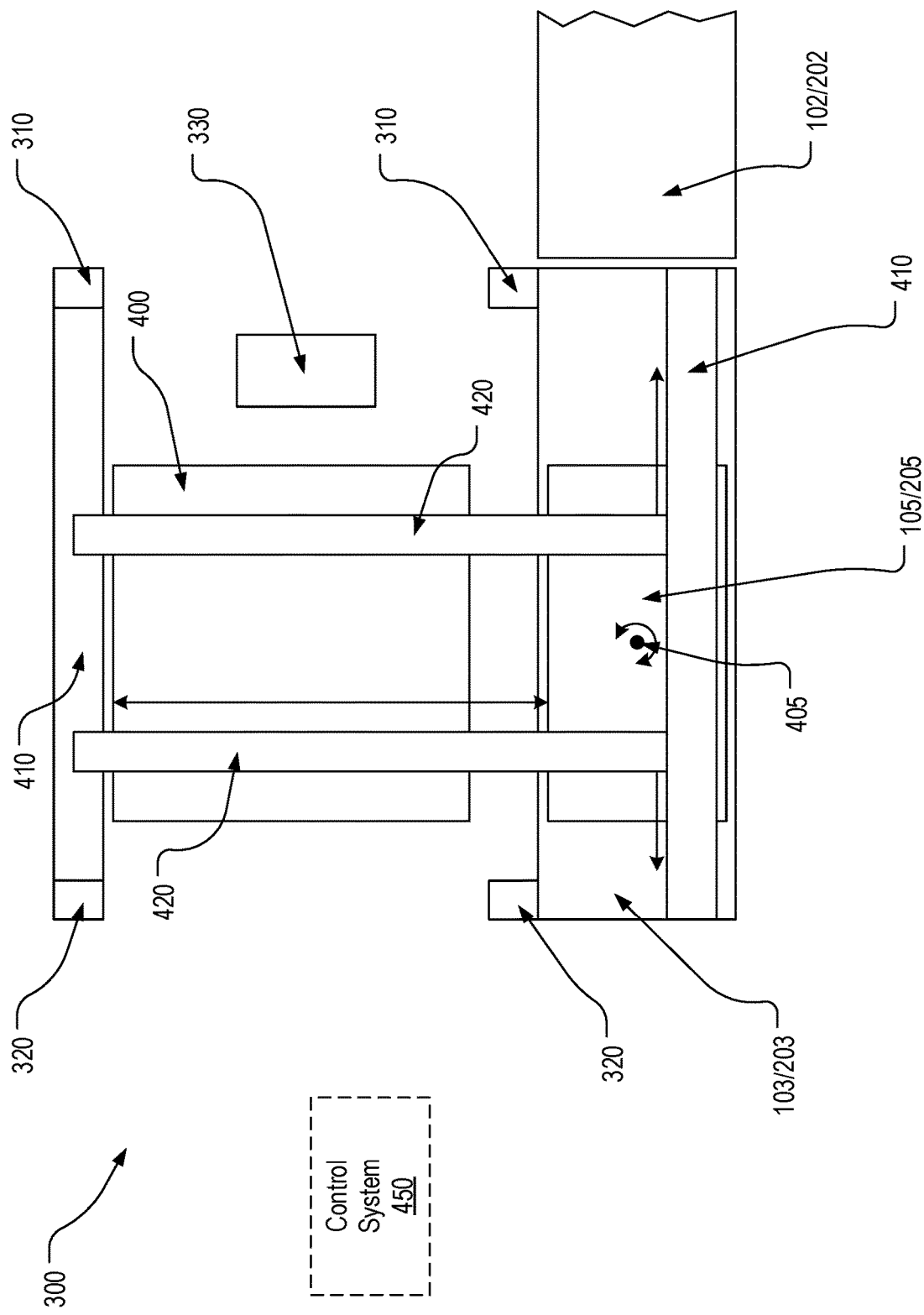

FIG. 4B also represents a simplified top view of the stacking area of either sod harvester 100 or sod harvester 200 and is intended to represent how stacking head 105/205 could collide with a portion of frame 300. In addition to what is shown in FIG. 4A, FIG. 4B also shows tracks 410 and tracks 420 of the stacking head assembly which, as represented by the arrows, allow control system 450 to move stacking head 105/205 along the front-to-back (or y) axis and the side-to-side (or x) axis respectively of sod harvester 100/200. The stacking head assembly also includes a mechanism (removed for simplicity) that enables control system 450 to rotate stacking head 105/205 around its center axis 405.

If the pickup position in which stacking head 105/205 is located in FIG. 4B were consistently used, there would be no concern that stacking head 105/205 would collide with frame 300 during a stacking operation (at least without some error condition). In particular, if the pickup position were always directly to the side of pallet 400, stacking head 105/205 would travel directly side to side (except as necessary to account for rotated stacking positions) and would therefore avoid front vertical supports 310, rear vertical supports 320 and vertical support 330 (or any other portion of frame 300 that may define the envelope around the stacking area). In contrast, if the pickup position is moved frontwardly or rearwardly relative to the pickup position shown in FIG. 4B, the direct path from the pickup position to the stacking position could intersect with a portion of frame 300. For example, if the pickup position is towards the front of stacking conveyor 103/203 and the stacking position is over the left side of pallet 400, the direct path from the pickup position to the stacking position may intersect with vertical support 330. In such a scenario, if control system 450 were to cause stacking head 105/205 to traverse this direct path, the resulting collision between stacking head 105/205 and vertical support 320 could cause significant damage to sod harvester 100/200.

In some cases, control system 450 may be configured to dynamically determine the pickup position. Some non-limiting examples of such techniques are described in U.S. Pat. Nos. 9,363,937 and 9,258,937 which are incorporated herein by reference. In other cases, an operator may set or change a pickup position or stacking position. Regardless of the reason why a pickup position may not remain fixed for each stacking operation, similar difficulties exist for detecting when a collision may occur and responding to prevent the collision.

Control system 450 could prevent collisions by causing stacking head 105/205 to always return to or towards a central pickup position (e.g., the pickup position shown in FIG. 4B) before moving the stacking head towards the stacking position. In other words, control system 450 could cause stacking head 105/205 to travel along a path that has a J (or L) shape. However, such a technique may place restraints on the speed and efficiency of stacking given that the J-shaped path is longer than the direct path.

In addition to the variations in the pickup position, the possible rotation of stacking head 105/205 during a stacking operation further complicates the process of predicting a collision and preventing it. For example, control system 450 may know the position of center axis 405 regardless of the rotation of stacking head 105/205. However, it is the position of the edges, and particularly the corners, of stacking head 105/205 that must be accounted for. Yet, as stacking head 105/205 rotates, the position of the edges and corners relative to center axis 405 will change. In short, variations in the pickup position (whether due to dynamic techniques or manual changes) and the possibility of rotation during the stacking operation make it very difficult to determine whether any portion of stacking head 105/205 will collide with any portion of frame 300 during any particular stacking operation. For this reason, control system 450 may be configured to forego path optimizations—and therefore sacrifice speed and efficiency—to avoid the consequences of a collision.

Accordingly, there are many scenarios in which it would be beneficial for control system 450 to dynamically calculate whether a collision may occur during a stacking operation and/or to dynamically calculate a path for the stacking operation that avoids a collision while maximizing speed and efficiency. To enable such calculations, and in accordance with embodiments of the present invention, control system 450 can calculate and employ a virtual fence representing the extents of stacking head 105/205 at any given time. By knowing this virtual fence, control system 450 can determine whether a planned path for stacking head 105/205 during a stacking operation will cause stacking head 105/205 to collide with frame 300. Furthermore, by knowing this virtual fence and its position relative to the portions of frame 300, control system 450 can dynamically calculate a path between the pickup position and the stacking position that is most efficient such as the most direct path that avoids a collision.

Figure 5A:
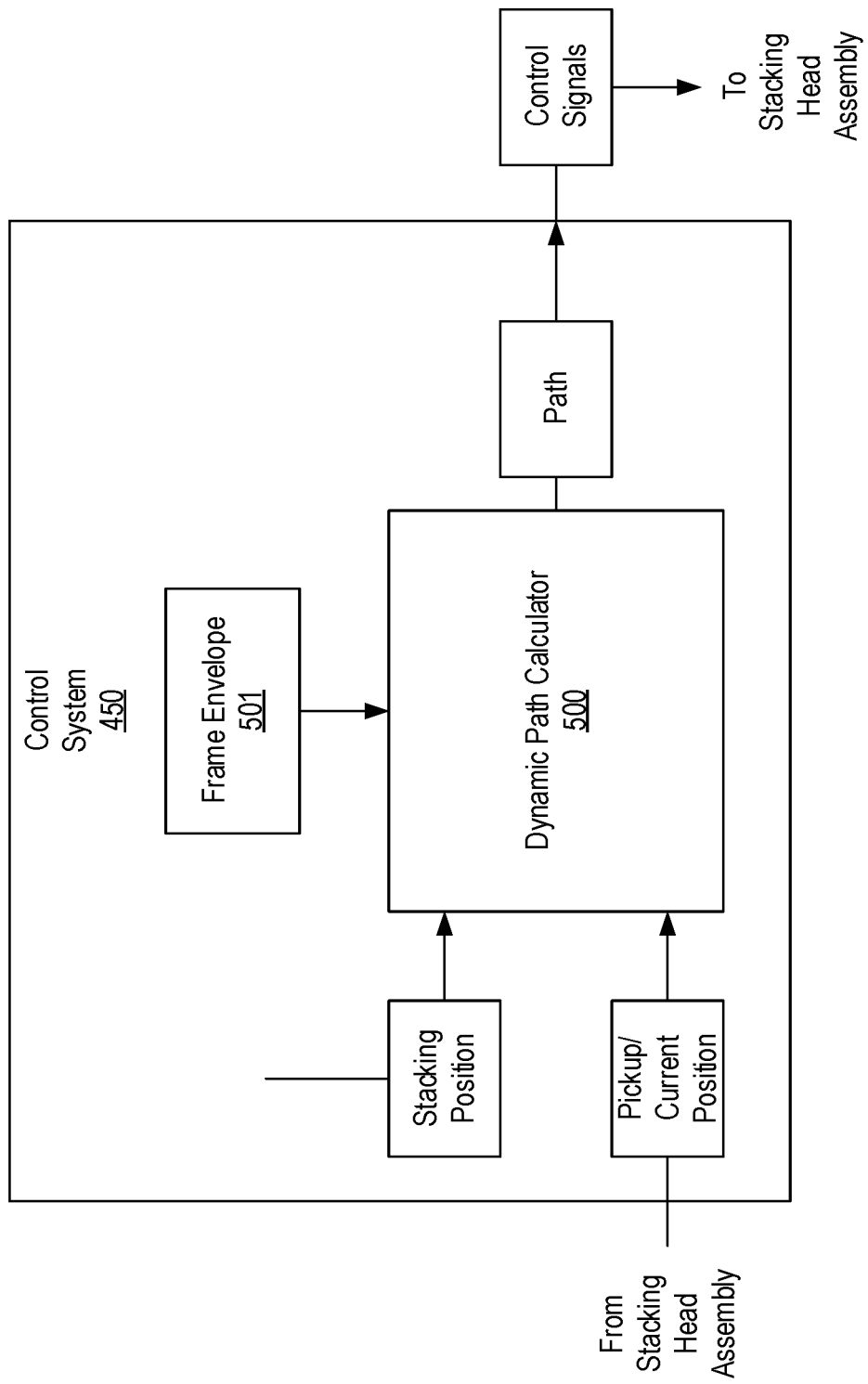
FIGS. 5A and 5B provide examples of a control system 450 that may be employed on a sod harvester to implement embodiments of the present invention.
Figure 5B:
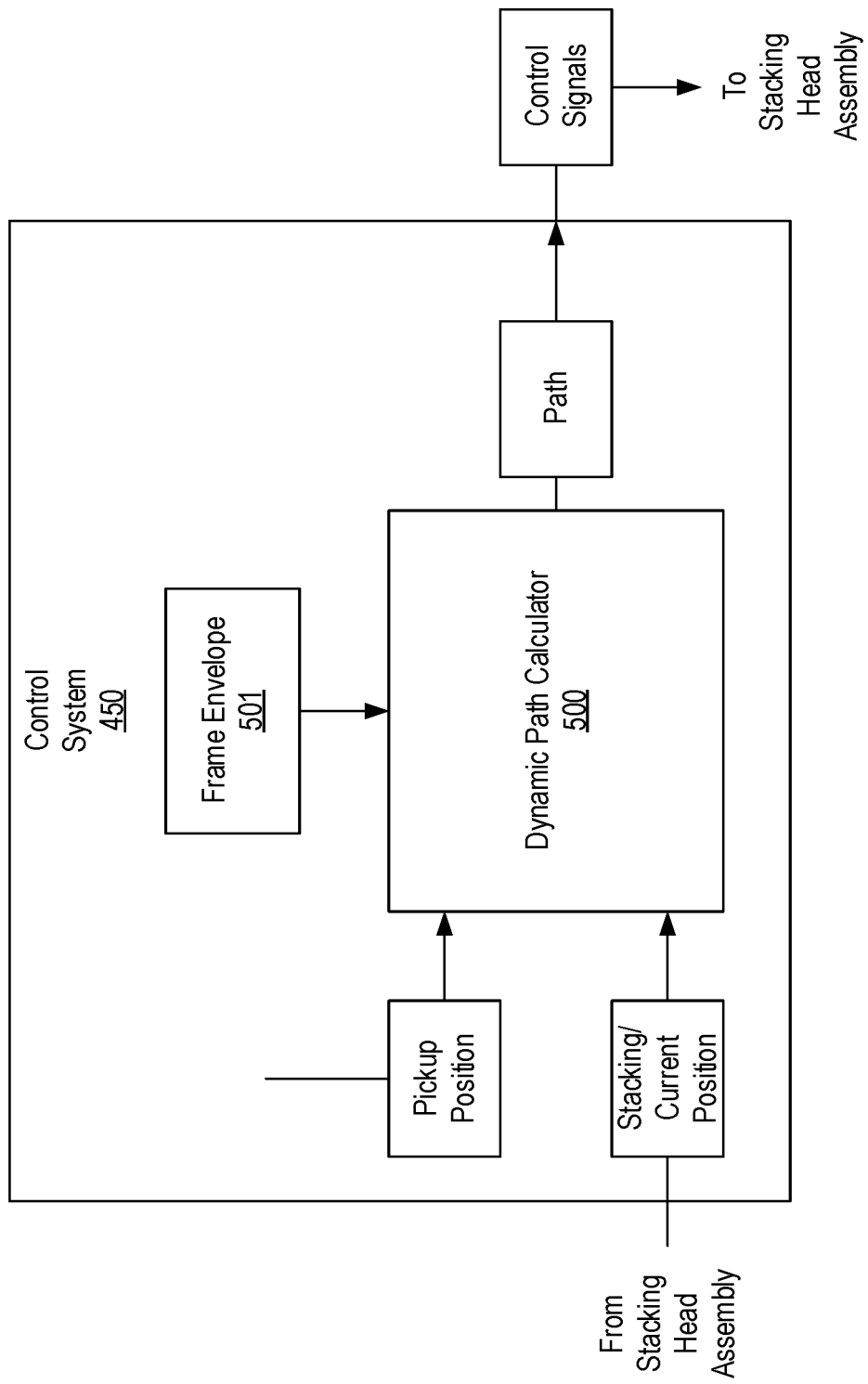

FIGS. 5A and 5B provide an example of how control system 450 can be configured to dynamically calculate a path for the stacking head during a stacking operation. As shown, control system 450 can be configured to implement a dynamic path calculator 500 that can receive as input a known frame envelope 501. As one example, frame envelope 501 could include a definition of the location of each portion of frame 300 including, but not limited to, front vertical supports 310, rear vertical supports 320 and vertical support 300. In general terms, frame envelope 501 could include a definition of the location of any structure of the sod harvester that stacking head 105/205 could possibly hit during a stacking operation. In some embodiments, frame envelope 501 could be manually defined. For example, dynamic path calculator 500 could employ a coordinate system and the coordinates of each portion of frame 300 within this coordinate system could be manually defined within frame envelope 501. As described in greater detail below, in some embodiments, control system 450 could be configured to learn frame envelope 501.

FIG. 5A represents a scenario when dynamic path calculator 500 calculates a path from the pickup position (or a current position of stacking head 105/205) to the next stacking position. In such a scenario, dynamic path calculator 500 can consider as inputs the stacking position to which stacking head 105/205 should travel and the pickup or current position from which stacking head 105/205 will travel. In contrast, FIG. 5B represents a scenario when dynamic path calculator 500 calculates a path from the stacking position (or current position of stacking head 105/205) to the next pickup position. In such a scenario, dynamic path calculator 500 can consider as inputs the pickup position to which stacking head 105/205 should travel and the stacking or current position from which stacking head 105/205 will travel. In some embodiments, control system 450 may leverage dynamic path calculator 500 to calculate paths for stacking head 105/205 when travelling in only a single direction (i.e., only paths from pickup positions to stacking positions or only paths from stacking positions to pickup positions), while in other embodiments, control system 450 may leverage dynamic path calculator 500 to calculate paths in both directions. Control system 450 can generate control signals based on the dynamically calculated path and output the control signals to the stacking head assembly to thereby cause stacking head 105/205 to traverse the path.

Figure 6A:
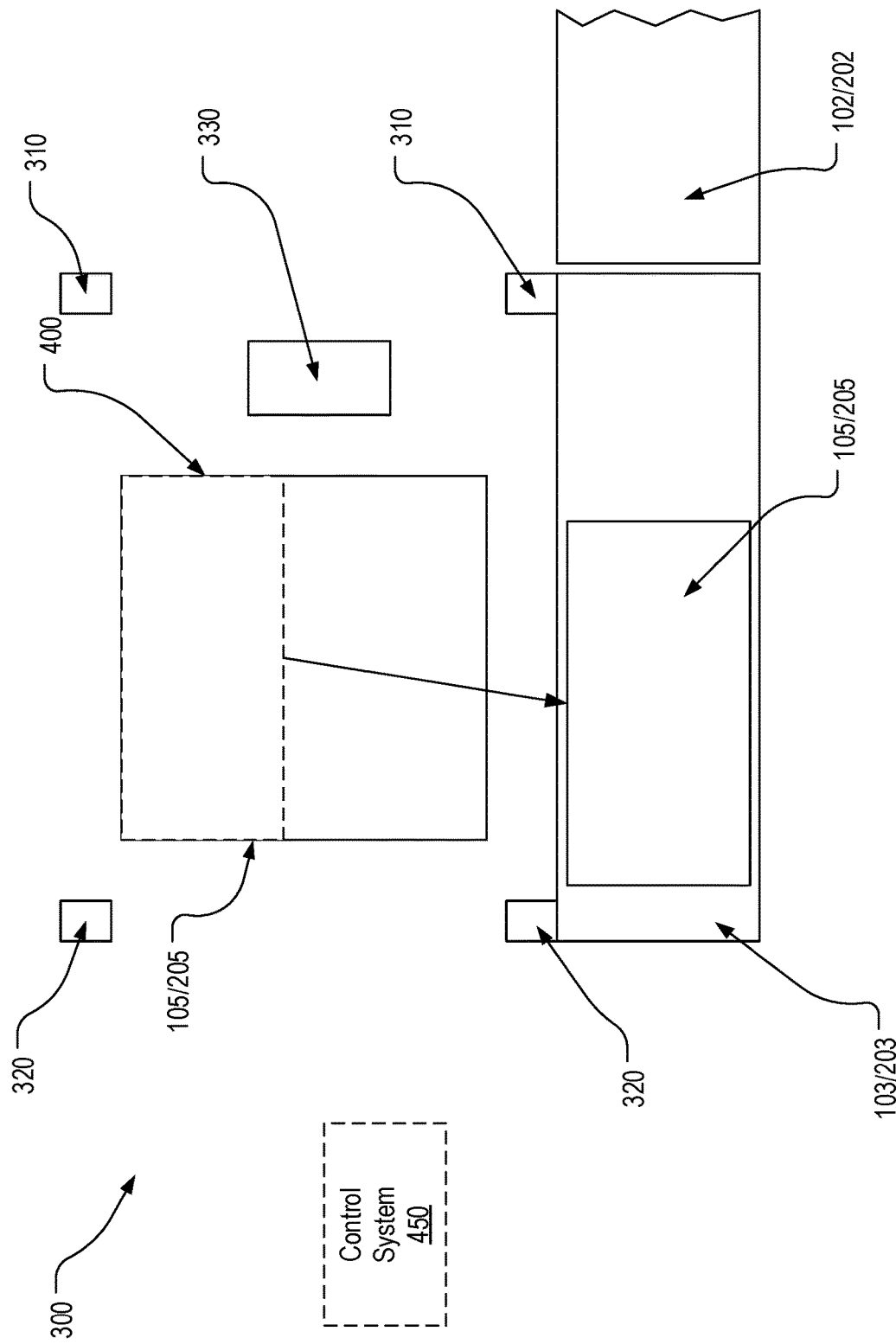
FIGS. 6A-6D provide an example of how a dynamic path calculator of a sod harvester's control system can dynamically calculate a path that avoids a collision.
Figure 6B:
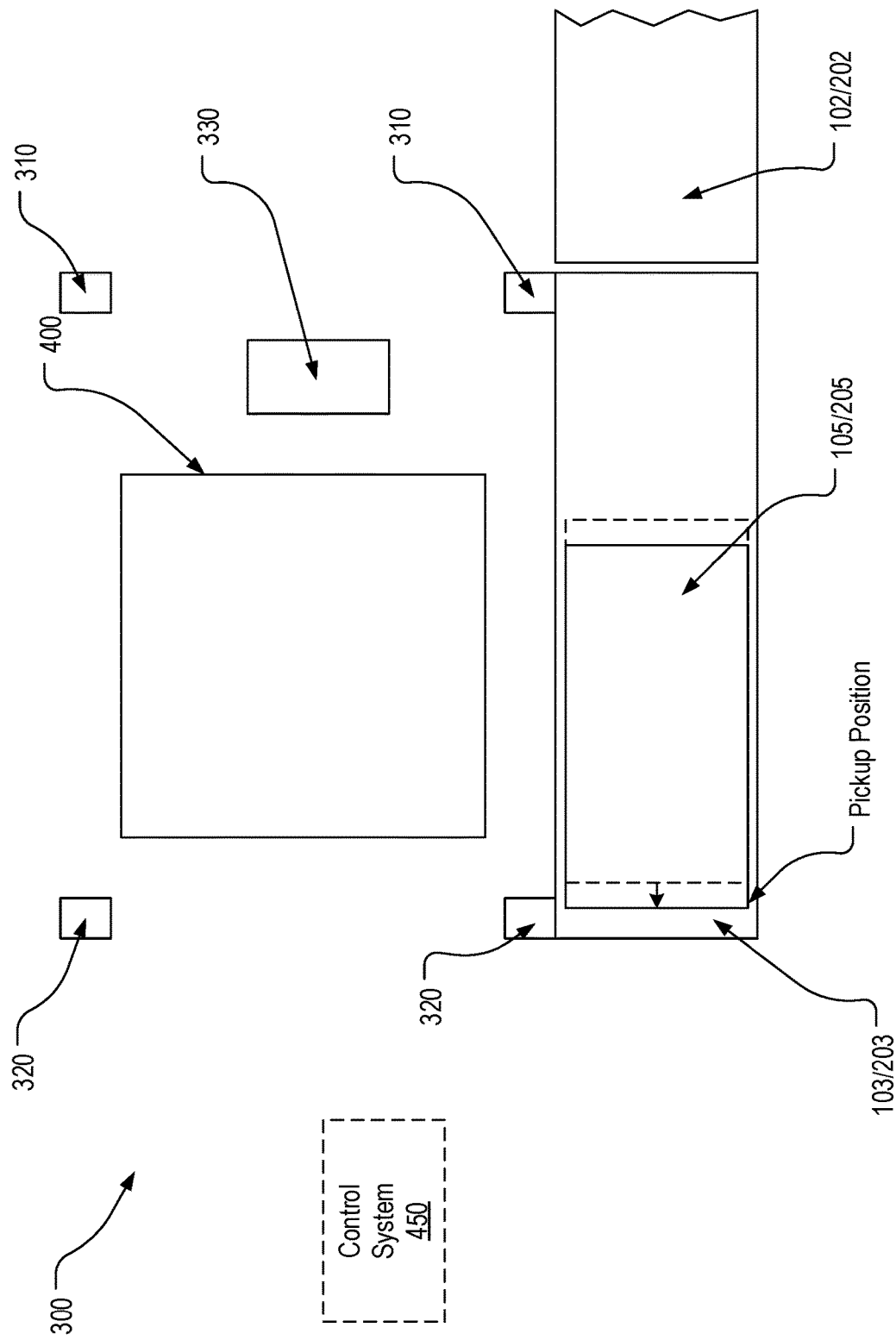

FIGS. 6A-6D provide an example of how dynamic path calculator 500 can dynamically calculate a path for stacking head 105/205 from a pickup position to a stacking position. In this example, the pickup position is located towards the rear of stacking conveyor 103/203. In FIGS. 6A and 6B, it is assumed that stacking head 105/205 reached this pickup position by implementing the techniques described in U.S. Pat. No. 9,363,937 (e.g., by alternating between picking up sod in a frontward pickup position and a rearward pickup position as shown in FIG. 6A) and by implementing the techniques described in U.S. Pat. No. 9,258,937 (e.g., by moving rearward while securing the sod as shown in FIG. 6B). However, stacking head 105/205 could reach this pickup position for any of a number of reasons including when the operator manually inputs a pickup position.

Figure 6C:
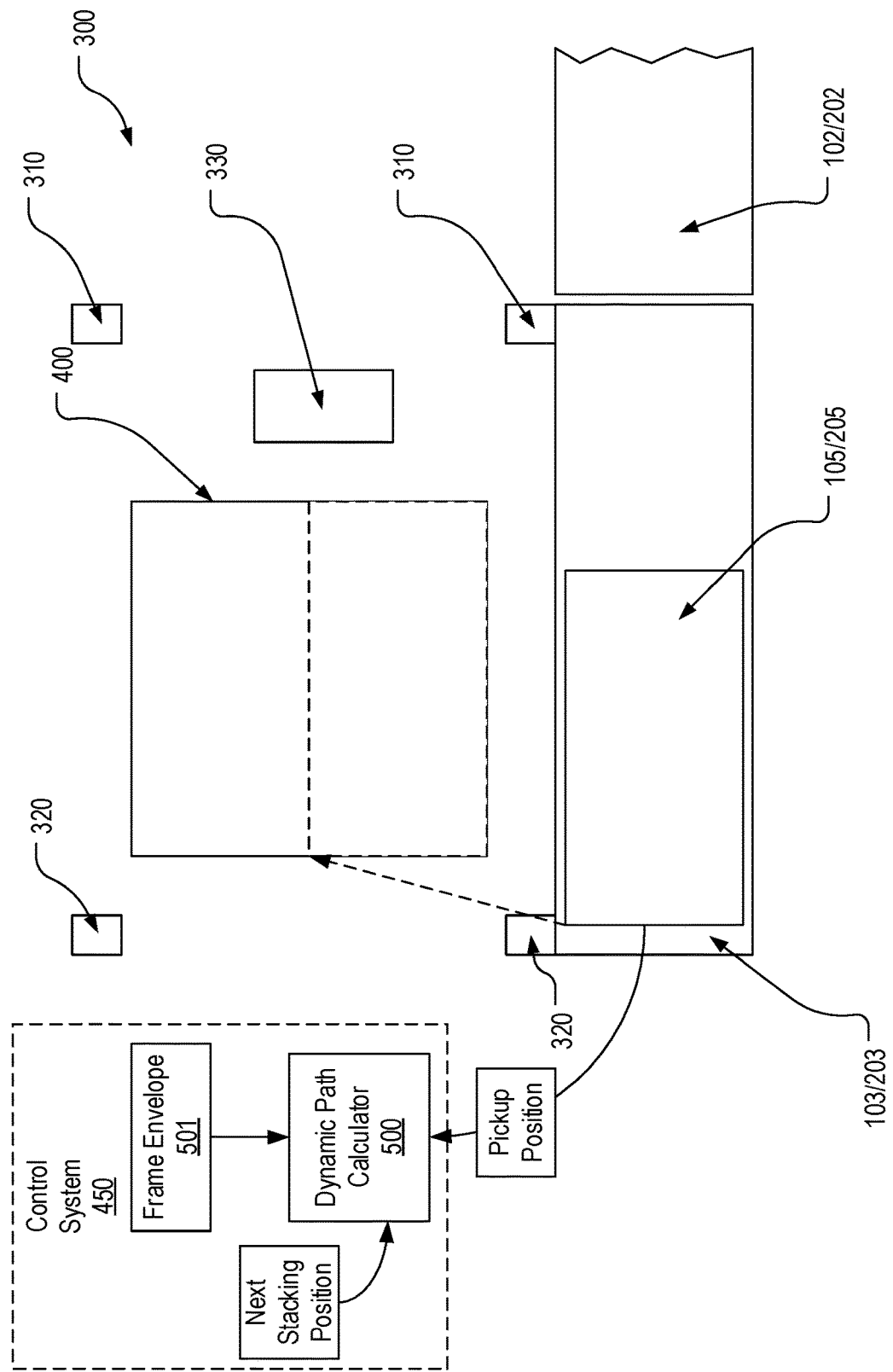

Regardless of the reason why stacking head 105/205 may be in the depicted pickup position, dynamic path calculator 500 can receive/detect the pickup position as represented in FIG. 6C. Dynamic path calculator 500 can also receive/identify the next stacking position. For example, control system 450 may be configured to employ a defined sequence of stacking positions and the next stacking position in this defined sequence can be provided to as input to dynamic path calculator 500. In the depicted example, it is assumed that the next stacking position is an un-rotated stacking position that is closest to stacking conveyor 103/203 as represented in dashed lines. The dashed arrow also represents that, if stacking head 105/205 travels directly from the pickup position to the next stacking position, the rear, inner corner of stacking head 105/205 would collide with rear vertical support 320.

The pickup position that is reported by the stacking head assembly to dynamic path calculator 500 may typically define the location of center axis 405. In such cases, the pickup position alone is insufficient for dynamic path calculator 500 to determine whether a collision may occur along any given path that it may calculate for stacking head 105/205. This is particularly true given that stacking head 105/205 may be rotated during a stacking operation such that the location of the corners of stacking head 105/205 are not fixed relative to center axis 405. To address this issue, dynamic path calculator 500 can generate the virtual fence for stacking head 105/205 so that, in addition to knowing where center axis 405 is at any given time, dynamic path calculator 500 can also know where each corner of stacking head 105/205 is.

To calculate the virtual fence, dynamic path calculator 500 can use the known offsets of each corner relative to center axis 405 and the current rotation of stacking head 105/205 around center axis 405. As an example, if the x axis is assumed to extend from side to side of sod harvester 100/200 and the y axis is assumed to extend from front to back of sod harvester 100/200, the location of center axis 405 can be represented as a point (x, y) within the x, y plane. To simplify the example, and considering that a collision may occur regardless of the height of stacking head 105/205, the z axis (or vertical axis) will be ignored. However, dynamic path calculator 500 could consider the z axis (i.e., perform a three-dimensional analysis as opposed to a two-dimensional analysis) if frame 300 includes portions that are not vertically oriented or that do not extend fully along the vertical axis encompassed by frame envelope 501.

With center axis 405 represented as a point in the x, y plane, each corner of stacking head 105/205 can be represented by a point that is offset from center axis 405 such as (x−a, y+b) for the front, left corner, (x+a, y+b) for the front, right corner, (x−a, y−b) for the rear, left corner and (x+a, y−b) for the rear, right corner. When stacking head 105/205 is not rotated, and assuming the stacking head has a rectangular shape, the virtual fence can be defined as the rectangular with these four corners.

In contrast, when stacking head 105/205 is rotated around center axis 405, the location of center axis 405 will still be defined by a point (x, y), but the location of the corners will be rotated relative to this point. To calculate the location ($x_{rotated}$, $y_{rotated}$) of a corner when stacking head 105/205 is rotated by θ degrees (including when θ is 0), the following equations can be employed where (x, y) are the coordinates for center axis 405 and ($x_{corner}$, $y_{corner}$) are the coordinates for the corner relative to center axis 405 when stacking head 105/205 is not rotated:

$$x_{rotated}=(((x_{corner}-x)*\cos(\theta))-((y_{corner}-y)*\sin(\theta)))+x$$

$$y_{rotated}=(((x_{corner}-x)*\sin(\theta))+((y_{corner}-y)*\cos(\theta)))+y$$

These equations yield the coordinates ($x_{rotated}$, $y_{rotated}$) for each of the four corners which dynamic path calculator 500 can employ to define the virtual fence at any given time.

In some embodiments, with the virtual fence calculated for stacking head 105/205 while it is in the pickup position, dynamic path calculator 500 can use the virtual fence and frame envelope 501 to detect whether a collision may occur. For example, dynamic path calculator 500 could determine whether the virtual fence will intersect with any portion of frame envelope 501 if stacking head 105/205 is moved directly from the pickup position to the stacking position.

As is generally represented by the dashed arrow in FIG. 6C, dynamic path calculator 500 could compare the coordinates of the virtual fence that it calculates for an intended path of stacking head 105/205 to the coordinates of the components defined in frame envelope 501 to determine whether the virtual fence will overlap with (or come within a minimal threshold of) any of the components of frame 300. If so, dynamic path calculator 500 can determine that a collision would occur and take appropriate action.

In some embodiments, when dynamic path calculator 500 determines that a collision would occur, it could trigger an error condition which could cause control system 450 to prevent stacking head 105/205 from being moved to the stacking position. In other words, in some embodiments, dynamic path calculator 500 may be employed only to detect and prevent collisions that would otherwise occur if stacking head 105/205 is moved along the direct (or intended) path between the pickup position and the stacking position or along the direct (or intended) path between the stacking position and the pickup position.

In contrast, in other embodiments, dynamic path calculator 500 may not only detect whether a collision would occur, but, if so, may dynamically calculate a path that avoids the collision. In some cases, this path may be the most efficient or direct path that avoids a collision.

Figure 6D:
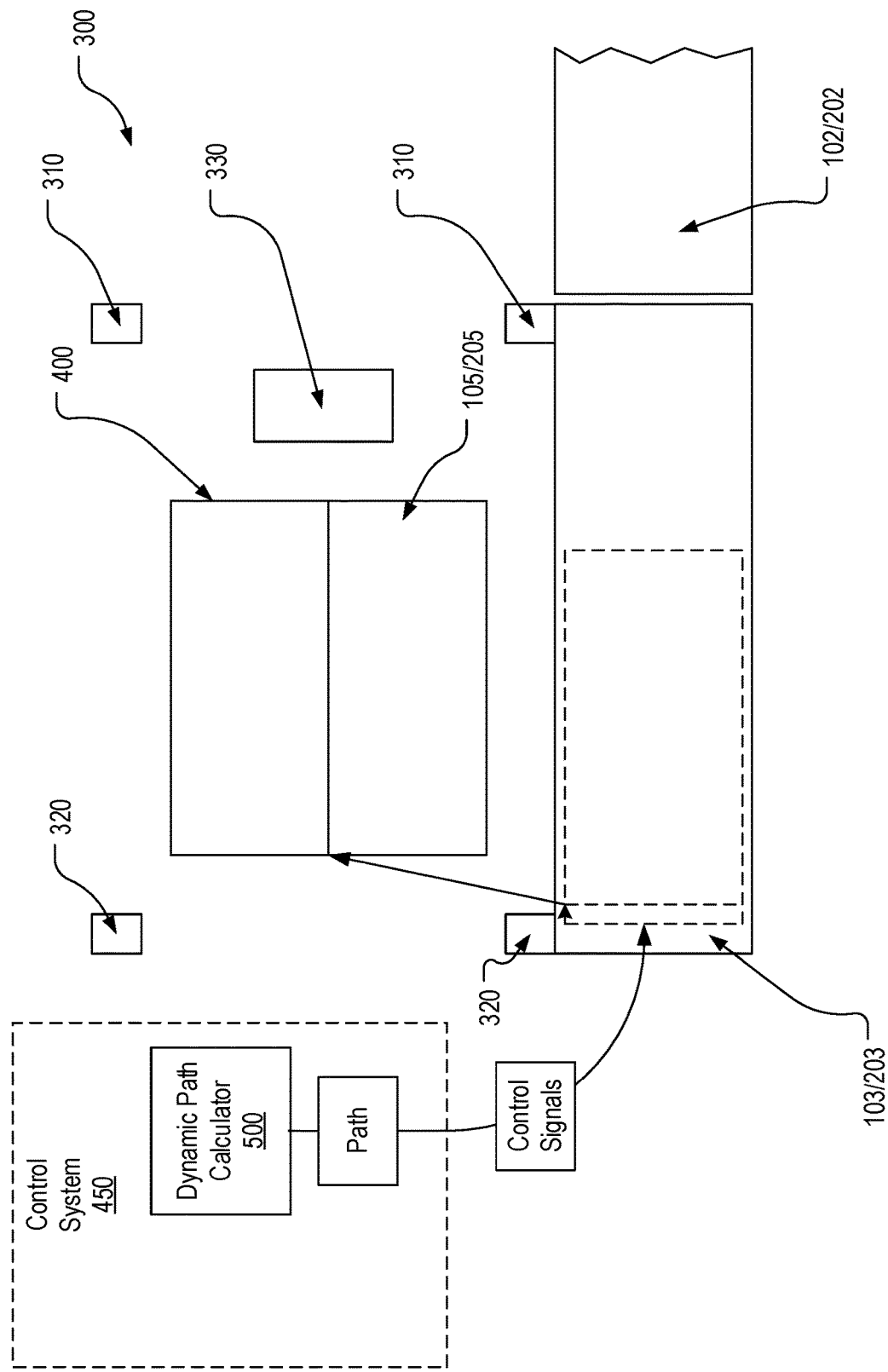

FIG. 6D represents one example of how dynamic path calculator 500 may dynamically calculate such a path. In this example, dynamic path calculator 500 can employ the virtual fence of stacking head 105/205 while it is in the depicted pickup position and frame envelope 501 to determine that the rear, inner corner of stacking head 105/205 would contact rear vertical support 320 if stacking head 105/205 is moved directly from the pickup position to the stacking position. In response to predicting this collision, dynamic path calculator 500 can also calculate a path that avoids the collision. For this example, it is assumed that dynamic path calculator 500 calculates a path which includes initially moving stacking head 105/205 directly forward until the virtual fence (and particular the rear, inner corner of the virtual fence) is clear of rear vertical support 320 as defined in frame envelope 501 (e.g., until the y coordinate(s) of the rear side of virtual fence exceeds the y coordinate(s) of rear vertical support 320). After this initial forward movement, the path includes moving stacking head 105/205 directly to the stacking position. Control system 450 can send control signals to the stacking head assembly to cause stacking head 105/205 to travel over the dynamically calculated path. In this way, dynamic path calculator 500 causes stacking head 105/205 to deviate from the direct path to avoid a collision while still traveling along an efficient path.

In some embodiments, dynamic path calculator 500 may be configured to dynamically calculate the most efficient path by calculating the shortest path that avoids a collision. In some embodiments, dynamic path calculator 500 may be configured to dynamically calculate the most efficient path by calculating a path that minimizes the loss in inertia due to directional changes (e.g., by causing stacking head 105/205 to travel along a curved path around the predicted collision). In some embodiments, dynamic path calculator 500 may be configured to dynamically calculate the most efficient path by identifying a timing for rotating stacking head 105/205 to avoid a collision. In some embodiments, dynamic path calculator 500 may not attempt to maximize the efficiency of the dynamically-calculated path.

To this point, it has been assumed that dynamic path calculator 500 proactively calculates the path using the pickup position and the next stacking position (or the stacking position and the next pickup position). In other words, dynamic path calculator 500 calculates the path and then stacking head 105/205 is moved along the calculated path. However, in some embodiments, dynamic path calculator 500 may employ a more reactive technique for calculating the path. For example, control system 450 could be configured to cause stacking head 105/205 to travel over a direct path between the pickup position and the next stacking position by default. While stacking head 105/205 travels along this direct path, dynamic path calculator 500 could monitor the current position of stacking head 105/205 and generate a virtual fence for the current position. Dynamic path calculator 500 could then compare the virtual fence for the current position to frame envelope 501 to determine whether the virtual fence is within a threshold distance of any portion of frame 300. If so, dynamic path calculator 500 could adjust the path of stacking head 105/205 to avoid a collision. This process could be repeated throughout the stacking operation to reactively steer stacking head 105/205 away from any possible collision as it travels along the direct path.

Accordingly, embodiments of the present invention encompass implementations where dynamic path calculator 500 employs predictive techniques in which the virtual fence pertaining to a planned path of stacking head 105/205 is used to predict and avoid collisions, implementations where dynamic path calculator 500 employs reactive techniques in which the virtual fence calculated as stacking head 105/205 travels along a path to is used to detect and avoid collisions and implementations where dynamic path calculator 500 employs both the predictive and reactive techniques.

Figure 7A:
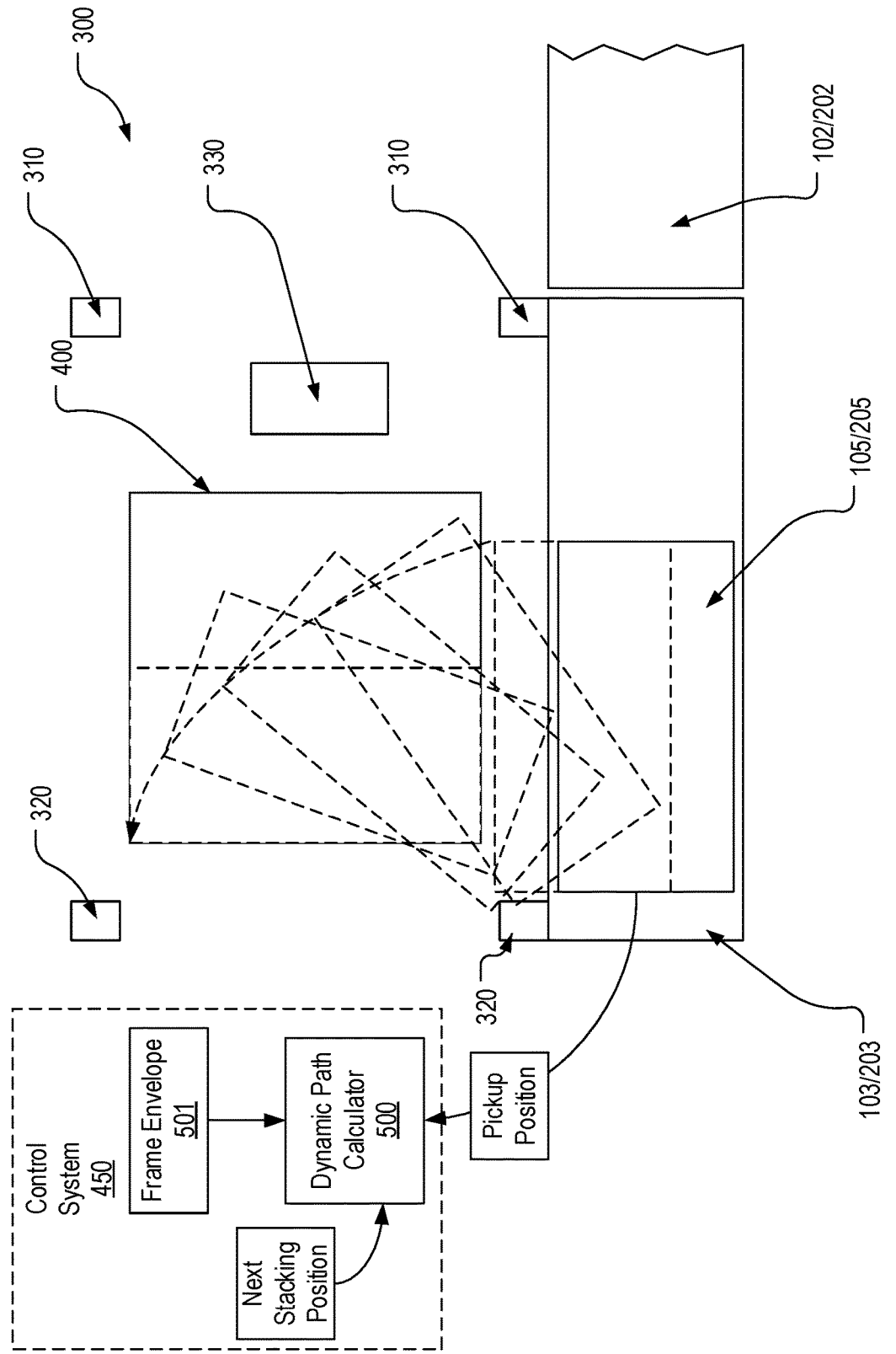
FIGS. 7A and 7B provide another example of how a dynamic path calculator of a sod harvester's control system can dynamically calculate a path that avoids a collision.
Figure 7B:
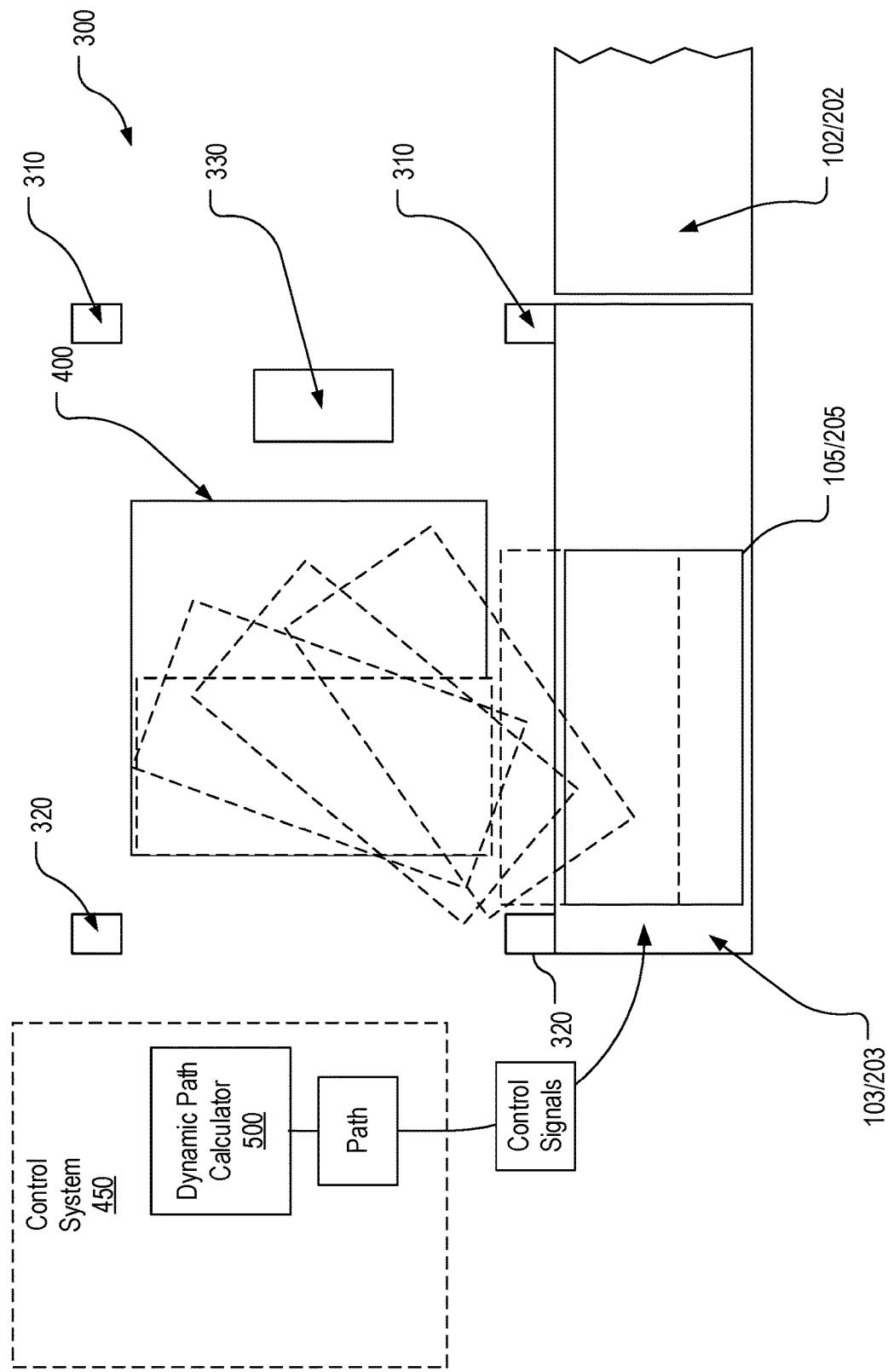

FIGS. 7A and 7B provide another example of how dynamic path calculator 500 may dynamically calculate a path from the pickup position to the next stacking position. Like the previous example, the pickup position in FIG. 7A is towards the rear of stacking conveyor 103/203. However, the next stacking position, which is represented in dashed lines, is a rotated, rearward stacking position. In this example, it is assumed that stacking head 105/205 is configured to rotate in a counterclockwise direction when viewed from above to transition from the pickup position to a rotated stacking position, but it could rotate in a clockwise direction or both directions in some embodiments. FIG. 7A also includes a dashed representation of stacking head 105/205 as it travels along the direct path from the pickup position to the next stacking position. As can be seen, this direct path would cause stacking head 105/205 to collide with rear vertical support 320. Notably, even though the pickup position is frontward of rear vertical support 320, the rotation of stacking head 105/205 would cause the rear, inside corner of stacking head 105/205 to collide with rear vertical support 320.

Turning to FIG. 7B, by generating a virtual fence for stacking head 105/205 and predictively and/or reactively comparing the virtual fence to frame envelope 501, dynamic path calculator 500 could detect this collision and dynamically calculate a path that avoids it. For example, FIG. 7B represents a scenario where the dynamic path includes delaying the rotation of stacking head 105/205 until the rear, inside corner is clear of rear vertical support 320. Accordingly, FIG. 7B depicts an example where the dynamically-calculated path differs from the direct path only in the timing of rotation.

FIG. 7B also provides an example of when a collision may occur between stacking head 105/205 and the portions of frame on the left side of sod harvester 100/200 (e.g., rear vertical support 320 towards the top of FIG. 7B or any structure extending between this rear vertical support 320 and front vertical support 310). In particular, if the rotation of stacking head 105/205 is not completed before stacking head 105/205 has travelled fully to the left, the corner may extend leftward beyond the stacking position and could collide with frame 300 even if the stacking position is properly defined.

Figure 8A:
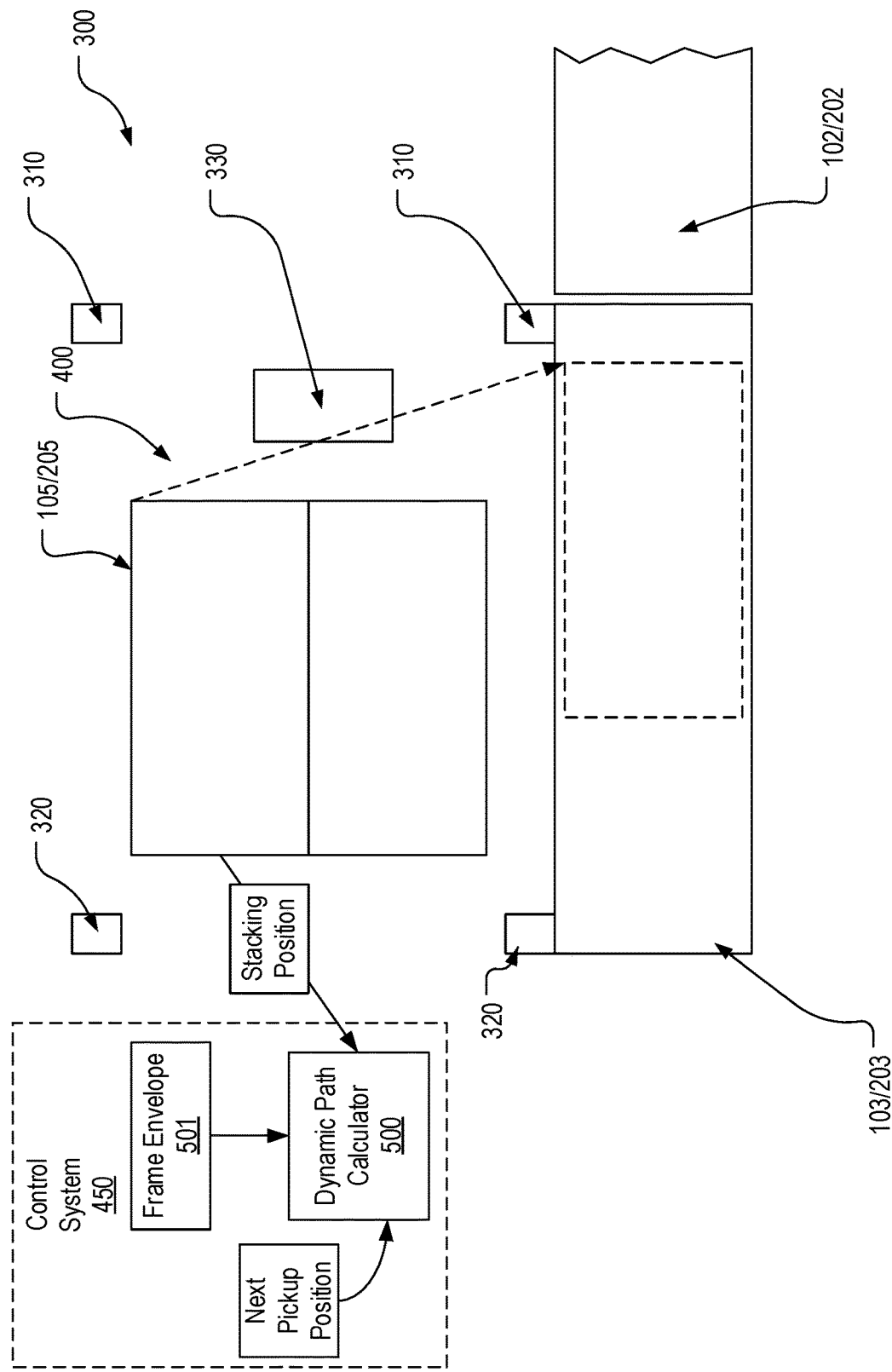
FIGS. 8A and 8B provide another example of how a dynamic path calculator of a sod harvester's control system can dynamically calculate a path that avoids a collision.
Figure 8B:
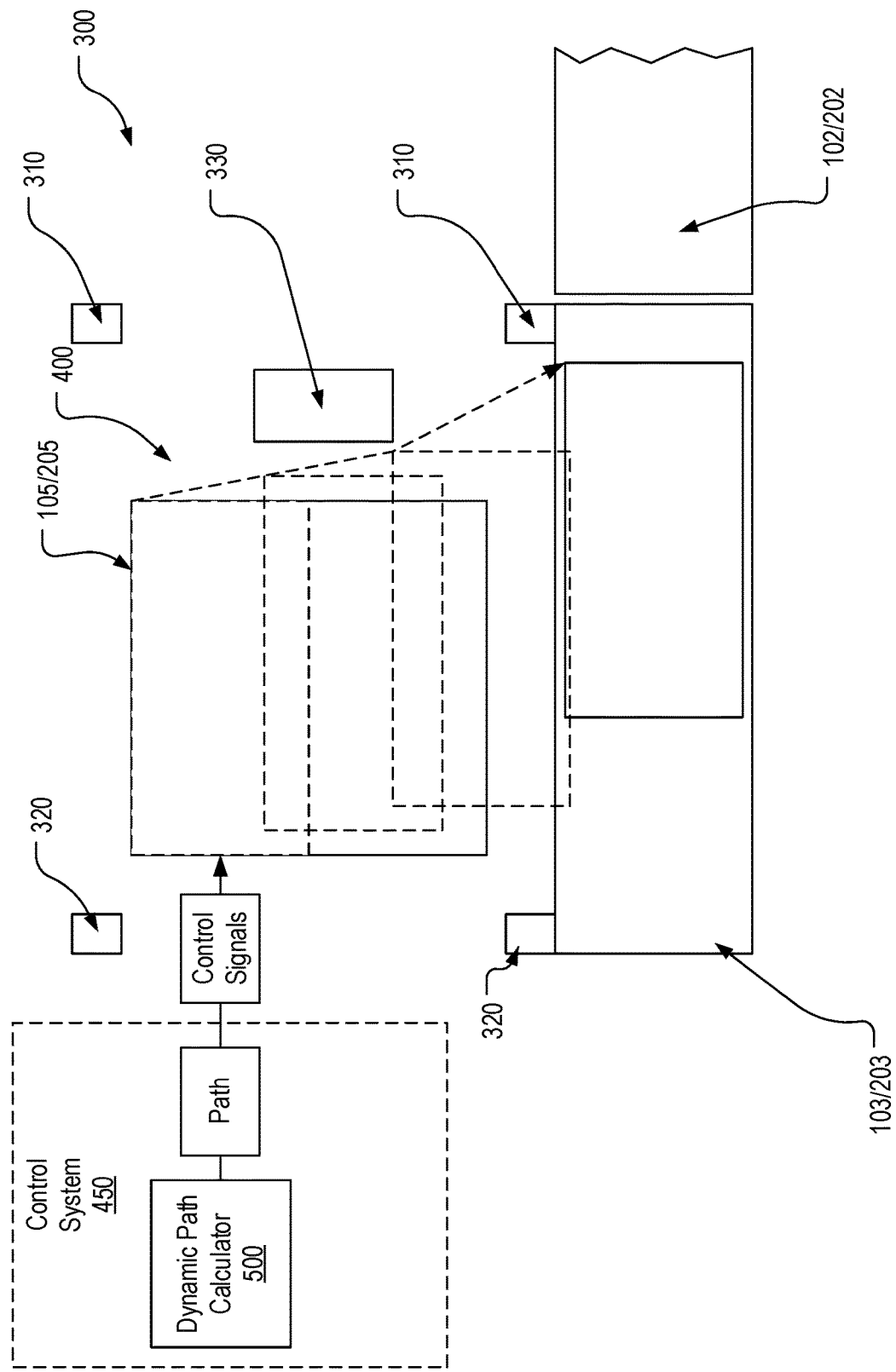

FIGS. 8A and 8B provide an example of how dynamic path calculator 500 may dynamically calculate a path from the stacking position to the next pickup position. In this example, the stacking position is an outer, un-rotated stacking position and the next pickup position, which is represented in dashed lines, is towards the front of stacking conveyor 103/203. As represented by the dashed arrow, if stacking head 105/205 were to travel along a direct path between the stacking position and the next pickup position, it would collide with vertical support 330.

In accordance with the techniques of the present invention, dynamic path calculator 500 can receive the stacking position and the next pickup position as inputs and generate the virtual fence for stacking head 105/205 along the path between these two positions. Dynamic path calculator 500 can detect, proactively and/or reactively, whether a collision would occur and can dynamically calculate a path to avoid any detected collision. As represented in FIG. 8B, this dynamically-calculated path could include initially moving stacking head 105/205 in a first direction until it has passed vertical support 330 and then moving stacking head 105/205 in a second direction to reach the pickup position. In some embodiments, these first and second directions can be selected to minimize the length of the path that stacking head 105/205 travels.

In summary, due to the possibly dynamic nature of the pickup positions and the rotation of stacking head 105/205, it can be very difficult to pre-configure a sod harvester's control system to avoid a collision, particularly when speed and efficiency are desired. However, by configuring the control system with a dynamic path calculator in accordance with embodiments of the present invention, collisions can be detected and avoided even when the pickup or stacking positions may change, including when such changes occur dynamically during operation of the sod harvester.

These techniques for dynamically calculating the path may enable a sod harvester to be operated at even higher ground speeds. For example, the dynamic path calculation techniques can be used in conjunction with the techniques described in U.S. Pat. No. 9,363,937 to enable stacking head 105/205 to complete stacking operations at a rate that is sufficient to support higher ground speeds than would otherwise be possible using only the techniques of U.S. Pat. No. 9,363,937. However, the dynamic path calculation techniques can provide benefits, such as the avoidance of collisions, that are not dependent on the speed of harvesting.

Figure 9:
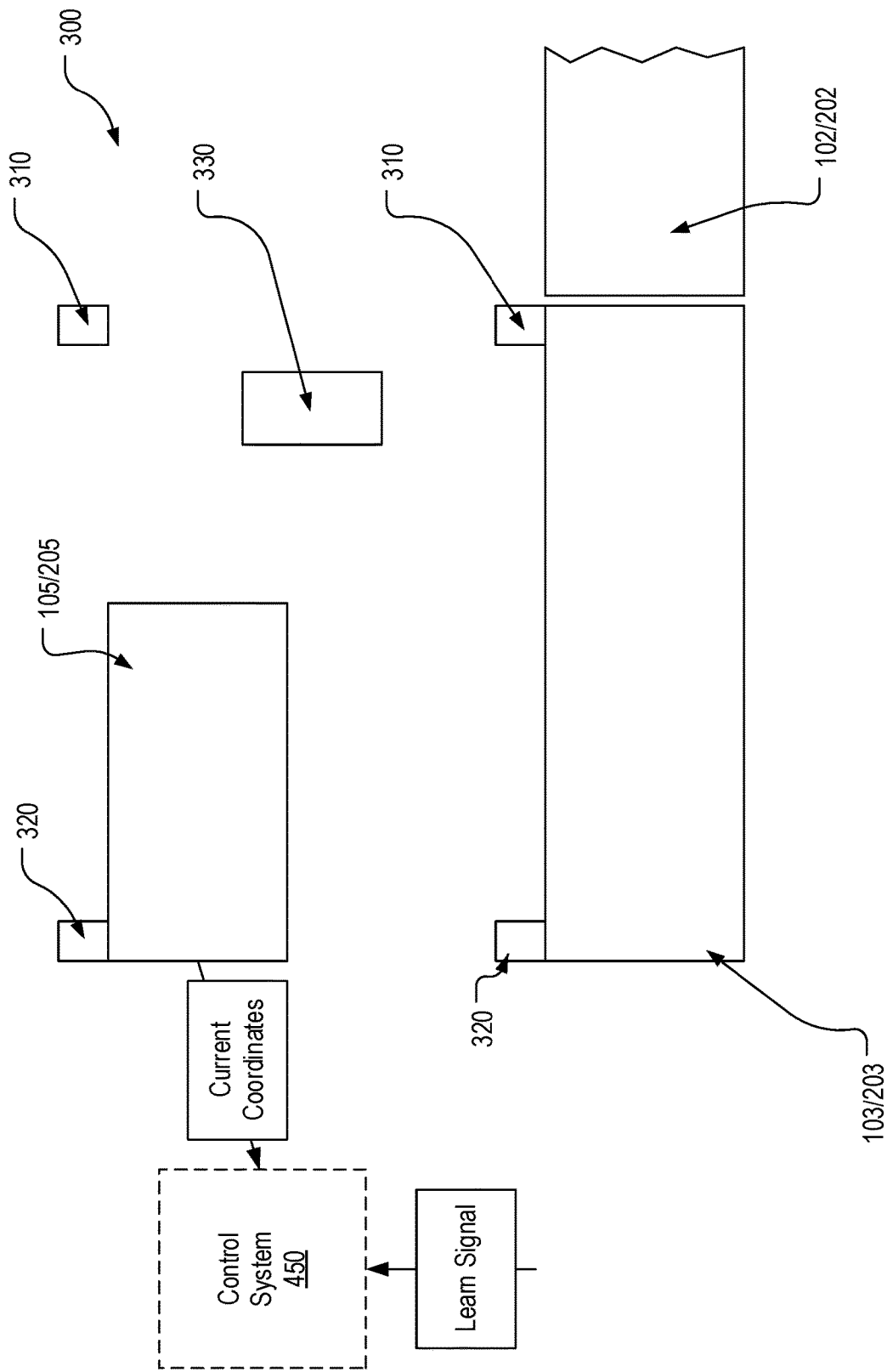
FIG. 9 provides an example of how a control system may learn the frame envelope of a sod harvester.

In some embodiments, control system 450 may be configured to learn frame envelope 501. For example, control system 450 could include a learning mode within which it can be configured to receive a learn signal from an operator. This learn signal can trigger control system 450 to obtain the current coordinates of stacking head 105/205. FIG. 9 provides an example where the operator has manually positioned stacking head 105/205 against rear vertical support 320 on the left side of sod harvester 100/200 and in the rearmost position (e.g., against a pallet injector assembly that is not shown). The operator can then provide the learn signal to control system 450 (e.g., by pressing a button on a control panel of sod harvester 100/200, by providing input to a mobile application or device that interfaces with control system 450, etc.). In response to receiving the learn signal, control system 450 can communicate with the stacking head assembly to obtain the current coordinates of stacking head 105/205. For example, the current coordinates could include the (x, y) coordinates of center axis 405 and the current rotation θ. From these current coordinates, control system 450 can learn where the rear, left corner of frame 300 is (which would correspond with the location of the rear, left corner of stacking head 105/205) and define a corresponding representation in frame envelope 501.

The operator can repeat this process by positioning stacking head 105/205 against each portion of frame 300 that surrounds the stacking area (or at least against each portion of frame 300 that the operator would like dynamic path calculator 500 to consider when detecting and avoiding collisions). In this way, control system 450 can learn where the boundaries of each portion of frame 300 are and populate frame envelope 501 accordingly. The use of this learning mode to create frame envelope 501 can be particularly beneficial when structural changes are made to frame 300 of a deployed sod harvester.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, performed by a control system of a sod harvester, for dynamically predicting a collision between the sod harvester's stacking head and frame, the method comprising:

during a stacking operation, detecting that the stacking head is to be moved from a first position to a second position along a path;

calculating a virtual fence for the stacking head along the path;

comparing the virtual fence to a frame envelope representing boundaries of the frame of the sod harvester to thereby determine that the virtual fence will intersect with the frame envelope as the stacking head moves from the first position to the second position along the path; and in response to determining that the virtual fence will intersect with the frame envelope, preventing the stacking head from moving from the first position to the second position along the path by:

calculating a virtual fence for the stacking head along a different path from the first position to the second position; and comparing the virtual fence for the stacking head along the different path to the frame envelope to thereby determine that the virtual fence for the stacking head along the different path will not intersect with the frame envelope as the stacking head moves from the first position to the second position along the different path.

2. The method of claim 1, wherein the first position is a pickup position and the second position is a stacking position.

3. The method of claim 1, wherein the first position is a current position.

4. The method of claim 1, wherein the virtual fence for the stacking head along the path is calculated before the stacking head is moved along the path.

5. The method of claim 1, wherein the virtual fence for the stacking head along the path is calculated while the stacking head is moved along the path.

6. The method of claim 1, wherein preventing the stacking head from moving from the first position to the second position along the path comprises stopping the stacking head.

7. The method of claim 1, wherein the different path is a shortest path between the first and second positions for which the virtual fence will not intersect with the frame envelope.

8. A sod harvester comprising:
a stacking conveyor positioned alongside a frame;
a pallet support positioned within the frame;
a stacking head that is configured to remove sod from the stacking conveyor and stack the sod on a pallet positioned on the pallet support; and
a control system for causing the stacking head to be moved between one or more pickup positions overtop the stacking conveyor and one or more stacking positions overtop the pallet, wherein the control system comprises a dynamic path calculator that is configured to detect and prevent collisions between the stacking head and the frame by:
calculating a virtual fence of the stacking head along a first path between a current pickup position and a next stacking position;

determining whether the virtual fence along the first path intersects with a frame envelope; and
when the virtual fence along the first path intersects with the frame envelope, preventing the stacking head from travelling along the first path.

9. The sod harvester of claim 8, wherein preventing the stacking head from travelling along the first path comprises causing the stacking head to travel along a second path between the current pickup position and the next stacking position.

10. The sod harvester of claim 8, wherein preventing the stacking head from travelling along the first path comprises stopping the stacking head.

11. The sod harvester of claim 8, wherein the dynamic path calculator calculates the virtual fence while the stacking head travels along the first path and wherein preventing the stacking head from travelling along the first path comprises altering the first path.

12. The sod harvester of claim 8, wherein altering the first path comprises one or more of changing a direction in which the stacking head is moving or rotating the stacking head.

13. The sod harvester of claim 8, wherein the dynamic path calculator detects and prevents collisions between the stacking head and the frame by:
determining that a direct path between a current position of the stacking head and a next position of the stacking head will cause a collision; and
causing the stacking head to move from the current position to the next position along an indirect path.

14. A method, performed by a control system of a sod harvester, for dynamically calculating a stacking head's path during a stacking operation, the method comprising:
detecting a first position;
determining a second position;
calculating a virtual fence for the stacking head along a first path between the first position and the second position;
comparing the virtual fence along the first path to a frame envelope; and
in response to determining that the virtual fence along the first path intersects with the frame envelope, calculating a second path from the first position to the second position, wherein calculating the second path comprises:
calculating a virtual fence along the second path;
comparing the virtual fence along the second path to the frame envelope; and
determining that the virtual fence along the second path does not intersect with the frame envelope.

15. The method of claim 14, wherein the first position is a pickup position and the second position is a stacking position.

16. The method of claim 14, further comprising:
employing a learning mode to learn the frame envelope.

* * * * *